United States Patent [19]

Kunau

[11] 4,390,189
[45] Jun. 28, 1983

[54] SELF-STEERING BOGIES FOR TRAILERS

[76] Inventor: Milo A. Kunau, Box 303, Miles, Iowa 52064

[21] Appl. No.: 248,922

[22] Filed: Mar. 30, 1981

[51] Int. Cl.³ .............................................. B62D 13/00
[52] U.S. Cl. .................................... 280/81 A; 280/86; 280/686
[58] Field of Search .............. 280/86, 680, 686, 81 A, 280/442

[56] References Cited

U.S. PATENT DOCUMENTS

| | | | |
|---|---|---|---|
| 2,631,043 | 3/1953 | Shaffer | 280/86 |
| 2,848,244 | 8/1958 | Georgi | 280/81 A |
| 3,057,639 | 10/1962 | Georgi | 280/81 A |
| 3,338,592 | 8/1967 | Helderbrandt | 280/81 A |
| 3,522,956 | 8/1970 | Saner | 280/81 A |
| 3,899,188 | 8/1975 | Curry | 280/81 A |

Primary Examiner—Robert R. Song
Attorney, Agent, or Firm—Glenn H. Antrim

[57] ABSTRACT

The load of a trailer is applied to lower members of shackles that have upper members rigidly attached to axle housings of tandem axle assemblies. Linkages and levers are connected between a lower pivotal member of a swivel assembly supporting the load and the ends of the axle assemblies. Rotation of the main frame of the trailer on the swivel arrangement during turning actuates the linkages and levers for displacing both axle assemblies in the desired directions to facilitate turning. The upper and lower members of each shackle move in a relative arcuate direction for raising the load slightly as the angle of turning is increased. The force of the load tends to return the shackles and the axle assemblies to the normal positions for straight travel and thereby contributes to stability.

4 Claims, 7 Drawing Figures

SELF-STEERING BOGIES FOR TRAILERS

BACKGROUND OF THE INVENTION

This invention relates to self-steering bogies for trailers, and particularly to bogies in which their loads are applied through flexible supporting means to respective pairs of tandem axles, and the axles of each of the pairs are displaced in opposite directions for steering.

Both axles of a bogie are turned for steering according to the arrangement described in U.S. Pat. No. 3,338,592 issued to W. Hildebrandt et al on Aug. 29, 1967. A main frame of a trailer is supported on a separate frame of a bogie by pivotal plates or a turntable, and the separate frame of the bogie is supported by a front and a rear turntable on a front and a rear axle-and-wheel assembly, respectively. An arrangement of linkages is connected from the main frame through the turntable that immediately supports the main frame to each of the turntables supported by the respective front and rear axles of the bogie. In response to rotation of the main frame with respect to the separate frame of the bogie, the axles are turned in opposite directions to follow without slippage of their wheels a curved path determined by the amount of turning of a forward tractor. Steering of both axles of bogies decreases tire wear, decreases the amount of power required to turn trailers, decreases the bending strain on the trailers, and steers the trailers to track more closely the tractors to help maintain the trailers safely in curved traffic lanes.

SUMMARY OF THE INVENTION

According to the present invention, the main frame of a trailer is supported on an upper member of a turntable. Each of four supporting shackles is positioned near respective ends of a pair of tandem axle housings of a bogie. An upper rigid member of each of the shackles is secured to the respective housing, and a lower member of each shackle is connected directly below the respective upper member by flexible supporting means. The flexible means supporting the lower members below the upper members may be either pivotally connected straps or lengths of steel cable. A lower member of the turntable is connected to a bracket and a leaf spring at each side of the bogie, and the ends of each of the springs are connected to respective lower members of the shackles near those ends of the axles along the respective side. Therefore, a load of a trailer is applied through the turntable, the bracket and the leaf spring arrangements to the lower members of the shackles, and then through the flexible supporting means of the brackets to their upper members attached to the axle housings. In this manner, the load is suspended straight below the axle housings by the flexible supporting means.

Steering is provided by moving the upper members of the shackles in forward and rearward directions with respect to the lower members that are connected more directly to the load. During straight travel of the trailer supported by the bogie, a linkage-and-lever arrangement maintains the lower members of the shackles according to their natural tendencies directly below the upper members to maintain each of the tandem axles of the bogie in a direction normal to the direction of travel. When the trailer is following a curve, the linkages are operated to turn the axles in opposite direction to the extent required to track the curve. To operate the linkages, a steering rod is connected between the main frame and the lever arrangement, and respective tie rods are connected between the lever arrangement and the axle housings at points near the shackles. Rotation of the main frame on the turntable during a curve operates the lever arrangement to turn the tandem axles in opposite directions as required for the wheels to follow the curve without slippage.

Advantages of the present arrangement are its simplicity, its compactness, and its tendency to return the axles to the positions for normal straight travel. Its simplicity and compactness results from using a single turntable and a relatively simple lever-and-linkage arrangement. Because of its compactness, the wheels of the bogie can be placed at the minimum required distances below the beds of trailers. The tendency to return to straight travel contributes to steady operation.

DESCRIPTION OF THE PREFERRED EMBODIMENT

Figure 1:
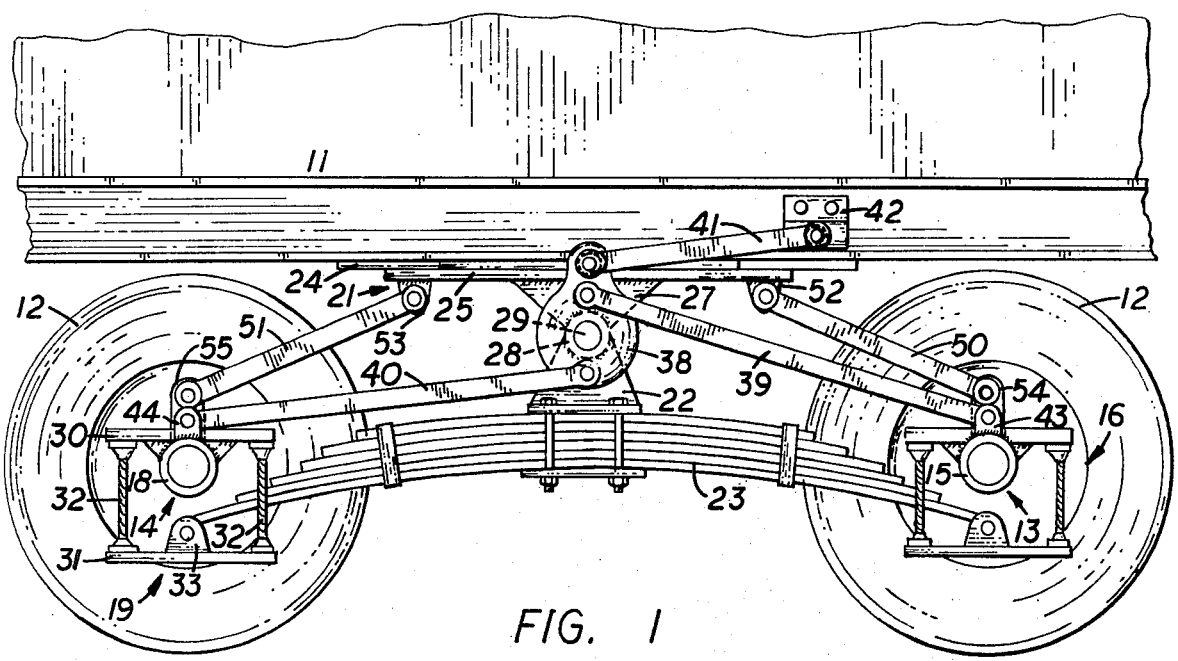
FIG. 1 is a right side view of the bogie of this invention with its right wheels removed.
Figure 2:
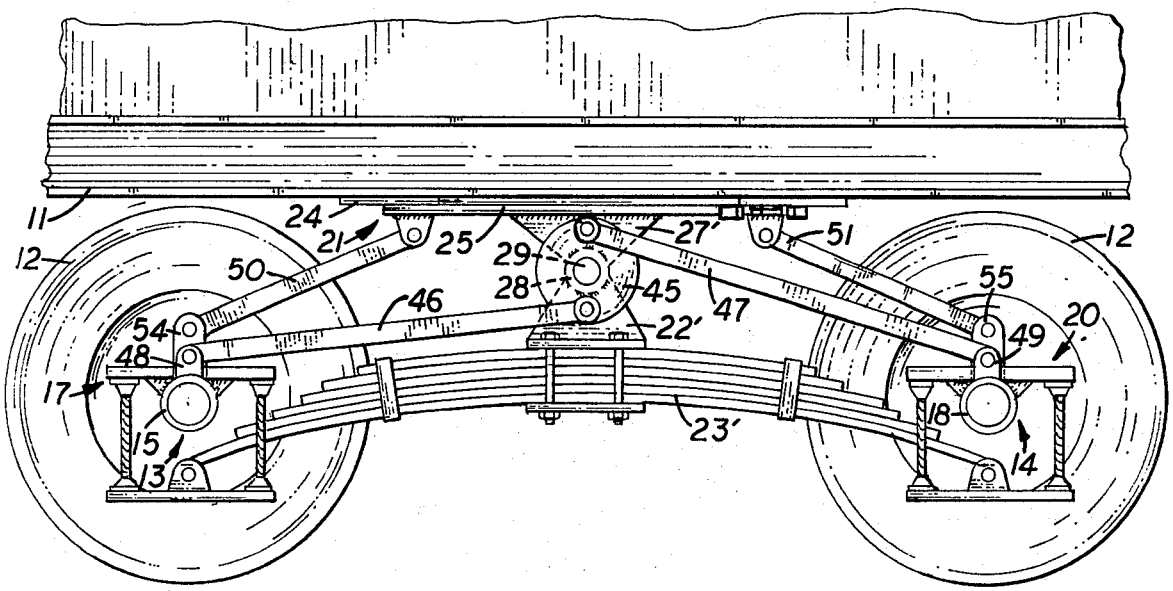
FIG. 2 is the left side of the bogie with the left wheels removed.
Figure 3:
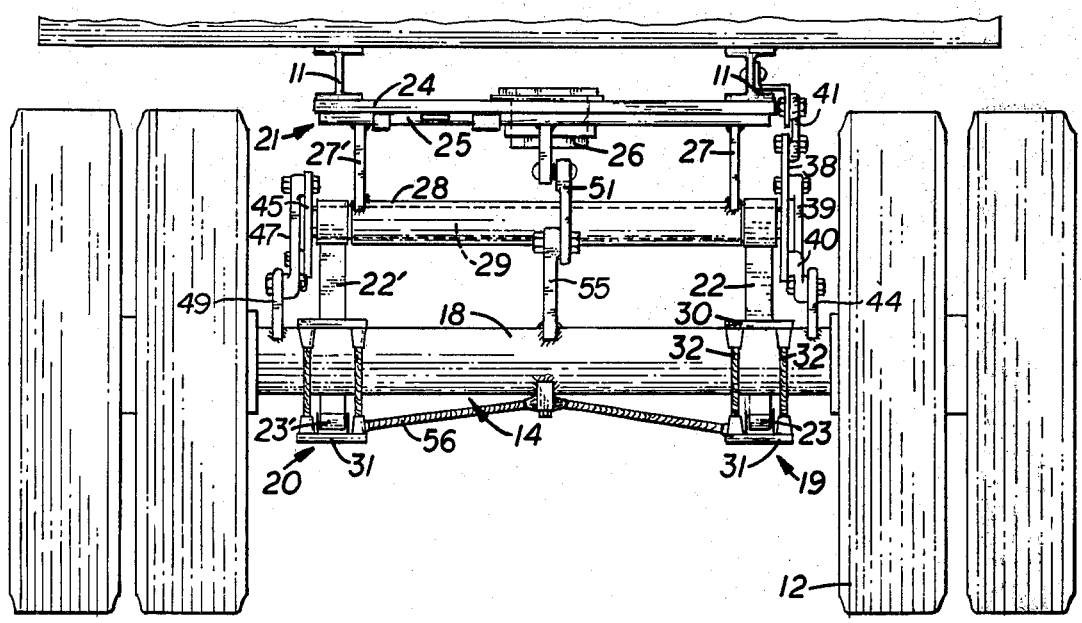
FIG. 3 is a rear view of the bogie.

With reference to FIGS. 1-3, a bogie according to the present invention shown connected to the lower side of frame members 11 of a trailer, include roadwheels 12, a tandem front axle assembly 13, and a rear axle assembly 14. A load on the frame members 11 is applied to a front axle housing 15 of the front axle assembly 13 through a right front shackle 16 and a left front shackle 17 and is applied to the rear axle housing 18 of the rear axle assembly 14 through a right rear shackle 19 and a left rear shackle 20.

The load carried by the frame members 11 of the trailer is applied to the shackles 16, 17, 19, and 20 through a turntable or pivotal plates 21, brackets 22 and 22', and leaf springs 23 and 23'. The turntable 21 comprises an upper pivotal member 24 attached to lower sides of the frame members 11 of the trailer and a lower pivotal member 25 rotatively supporting the upper pivotal member for rotation about a central kingpin 26 (FIG. 3). The lower pivotal member 25 has right and left downward directed, generally triangular projections 27 and 27'. The projections 27 and 27' are mounted in equal opposite transverse directions from the kingpin 26 with their bases upward and along longitudinal lines and with their apexes on a transverse line centered below the kingpin 26.

A strong piece of tubing 28 functioning as a supporting bearing is fixed between the apexes of the projections 27 and 27' to extend transversely in a centered position below a horizontal bearing portion of the lower pivotal member 25, the length of the tubing 28 being somewhat less than the maximum diameter of the member 25. A rotative rod 29 that functions both as a lever control rod and as a supporting axle extends through the tubing 28. Each of the brackets 22 and 22' has an upper bearing about the rod 29 adjacent a respective end of the tubing 28 and a lower conventional flange and bolts for secure attachment to the center of the respective leaf springs 23 or 23'.

With particular reference to the right rear shackle 19 of FIG. 1, each of the four brackets has a rigid rectangular upper member 30 with its central portion securely attached in a longitudinal position to the upper part of a respective axle housing 15 or 18. A lower rigid rectangular member 31 is attached by four vertical pieces of cable 32 connected between the corners of the members 30 and 31 for suspending the member 31 directly below the member 30. A bracket 33 for receiving in a usual manner a respective end of one of the leaf springs 23 and 23' is secured to the center of the upper surface of each of the lower members 31. The springs 23 and 23' curve upward from their ends to their respective central brackets 22 and 22'. The ends of the leaf springs 23 and 23' becomes somewhat farther apart when the trailer is loaded, and preferably dimensions are chosen such that the lower members 31 are directly below the respective upper members 30 of the shackles 16, 17, 19, and 20 when the trailer has a normal load.

Figure 5:
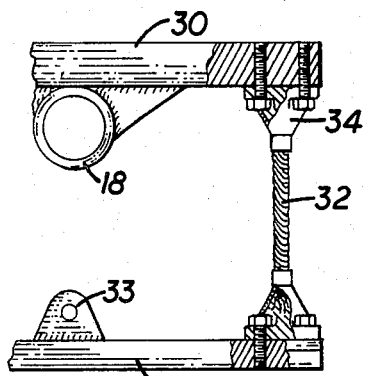
FIG. 5 is a fragmentary view of a shackle to show use of length of cables as flexible, supporting means as shown in FIGS. 1-4.
Figure 6:
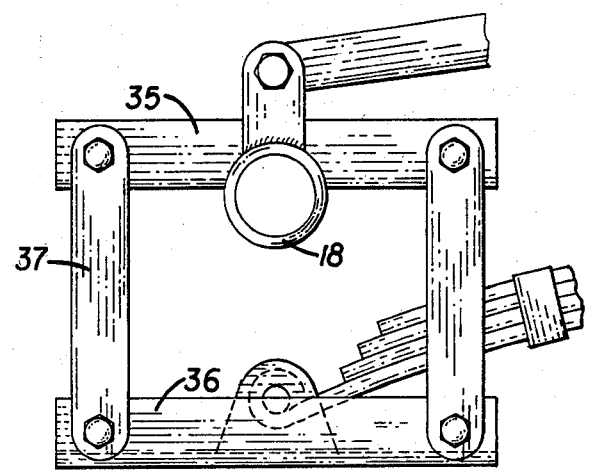
FIG. 6 is a side view of a different type shackle using pivotal straps as flexible means.
Figure 7:
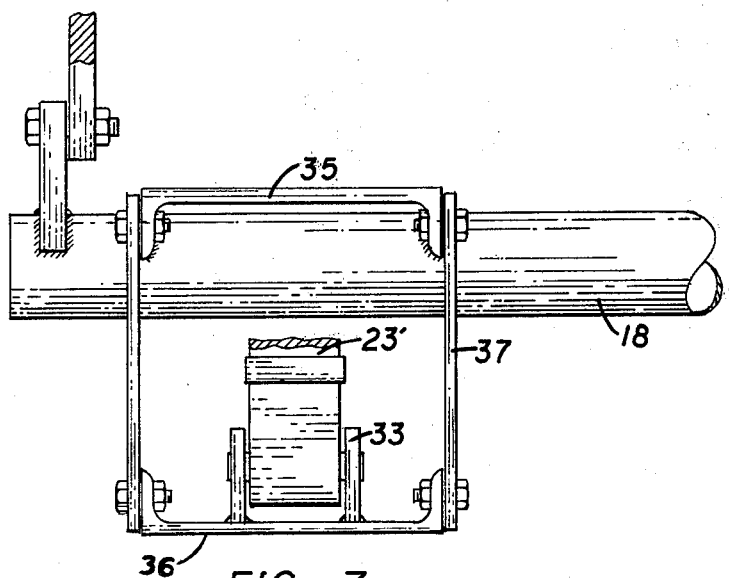
FIG. 7 is a rear view of the shackle of FIG. 6.

The construction of the shackle as shown in FIGS. 1-3 is shown in detail in FIG. 5, and a further embodiment is shown in FIGS. 6 and 7. The pieces of cable 32 of FIG. 5 may be of such length that the upper and lower members 30 and 31 are about 15 inches (381 mm) apart. The pieces of cable, like those used in construction machinery, have their ends embedded in lead within conical steel shells 34. Each of the bases of the shells 34 is attached to a member 30 or 31 by bolts extending through indentations adjacent the base and into threaded holes of the member.

A shackle according to FIG. 6 and FIG. 7 has a strap 37 at each corner near an outer edge of the upper and lower members 35 and 36 that correspond to the members 30 and 31 of FIG. 5. The ends of the strap 37 are pivotally attached by bolts to the members.

In FIGS. 1-3 and 7, the upper members 30 and 35 of the brackets are shown fixed quite closely over the axle housing 18, but depending upon the diameter of the road wheels 12, a spacer or a block may be used between the axle housing 18 and the upper member 30 or 35 to provide greater clearance between the lower members 31 or 36 and the roadway. The projections 27 and 27' and the brackets 22 and 22' for the leaf springs 23 and 23' may be changed in vertical dimensions as required to position the road wheels 12 a desired distance, for example, 5 inches (127 mm), below the floor of the trailer.

With reference to FIG. 1, a steering-control lever 38 is rigidly attached to an end of the rotative rod 29. An end of a tie rod 39 and an end of a tie rod 40 are connected to the lever 38 at points equally spaced above and below the rod 29 respectively. An end of a steering rod 41 is connected to the lever 38 at a more distant point above the rod or fulcrum 29, and the other end of the steering rod 41 is connected to a bracket 42 attached to the adjacent frame member 11 at a distance in front of the lever 38. Ball type connectors like those used in steering linkages are required at the ends of the steering rod 41 to provide the required freedom of rotation, and are preferably used at the ends of all of the tie rods. The tie rod 39, that has an end connected at a point intermediate the fulcrum 29 and the point to which the steering rod 41 is connected, extends forwardly to a short upward projection or connector 43 secured to the front axle housing 15 between the right front shackle 16 and the adjacent road wheel 12. Likewise, the tie rod 40 extends rearward from the lower point upon the lever 38 to a connector 44 projecting from the rear axle housing 18 adjacent the right rear shackle 19.

With reference to FIG. 2, a lever 45 connected to the opposite end of the rod 29 is connected to tie rods 46 and 47 at points spaced the same distance from the fulcrum 29 as the points to which the tie rods 38 and 40 are connected at the right side of the bogie. The corresponding points of connection for the tie rods 46 and 47 connected to the front axle housing 15 and to the rear housing 18 are interchanged so that the lower point is connected to the tie rod 46 for the front axle and the upper point is connected to the tie rod 47 for the rear axle. The ends of the tie rods 46 and 47 opposite the lever 45 are connected to connectors 48 and 49 for connection to the front axle housing 15 and the rear axle housing 18 respectively. The steering rod 41 and the tie rods 39, 40, 46, and 47 are of such lengths that the front and rear axle assemblies 13 and 14 are held in a straight, transverse direction for straight travel of the road wheels 12 while the frame members 11 of the trailer are in direction of straight travel. As customarily used on steering tie rods, the steering rod 41 and each of the tie rods are preferably provided with usual intermediate turn-buckle connectors (not shown) for adjusting their lengths exactly.

The front and rear axle housings 15 and 18 are restrained from rotating by a front stabilizing bar 50 and a rear stabilizing bar 51. The bars 50 and 51 preferably have ball-type connecting ends, and the inner ends of the bars 50 and 51 are connected respectively to short downward extending projections 52 and 53 positioned on a central longitudinal line through the lower pivotal member 25. The outer ends of the stabilizing bars 50 and 51 are attached to upper ends of short levers 54 and 55 respectively that extend upward from the front and the rear axle housings 15 and 18, respectively. With reference to FIG. 3, to prevent swaying from side to side, pieces of cable 56 are preferably connected from a lower center point of each axle housing 15 and 18 downward and outward to a respective adjacent lower member 31 of the shackles 16, 17, 19, and 20.

The area swept by a turning tractor and an attached trailer lies between an outer circle traced by the cab of the tractor and an inner circle that is tangential to a radial line normal to the trailer as shown in FIG. 7 of U.S. Pat. No. 3,899,188 issued to Norman Royce Curry on Aug. 12, 1975. The axles of the tandem wheels of a bogie are shown aligned with radial lines to the center of these circles. Since only the front wheels of the tandem wheels of that bogie can be turned with respect to the frame of that bogie, the frame that corresponds to the lower pivotal member 25 of the present bogie must be turned at a greater angle with respect to the longitudinal axis of the trailer in order to align the rear wheels, and the front wheels must be turned at a greater angle with respect to the frame of that bogie than the angle at which the wheels must be turned in the present bogie.

Figure 4:
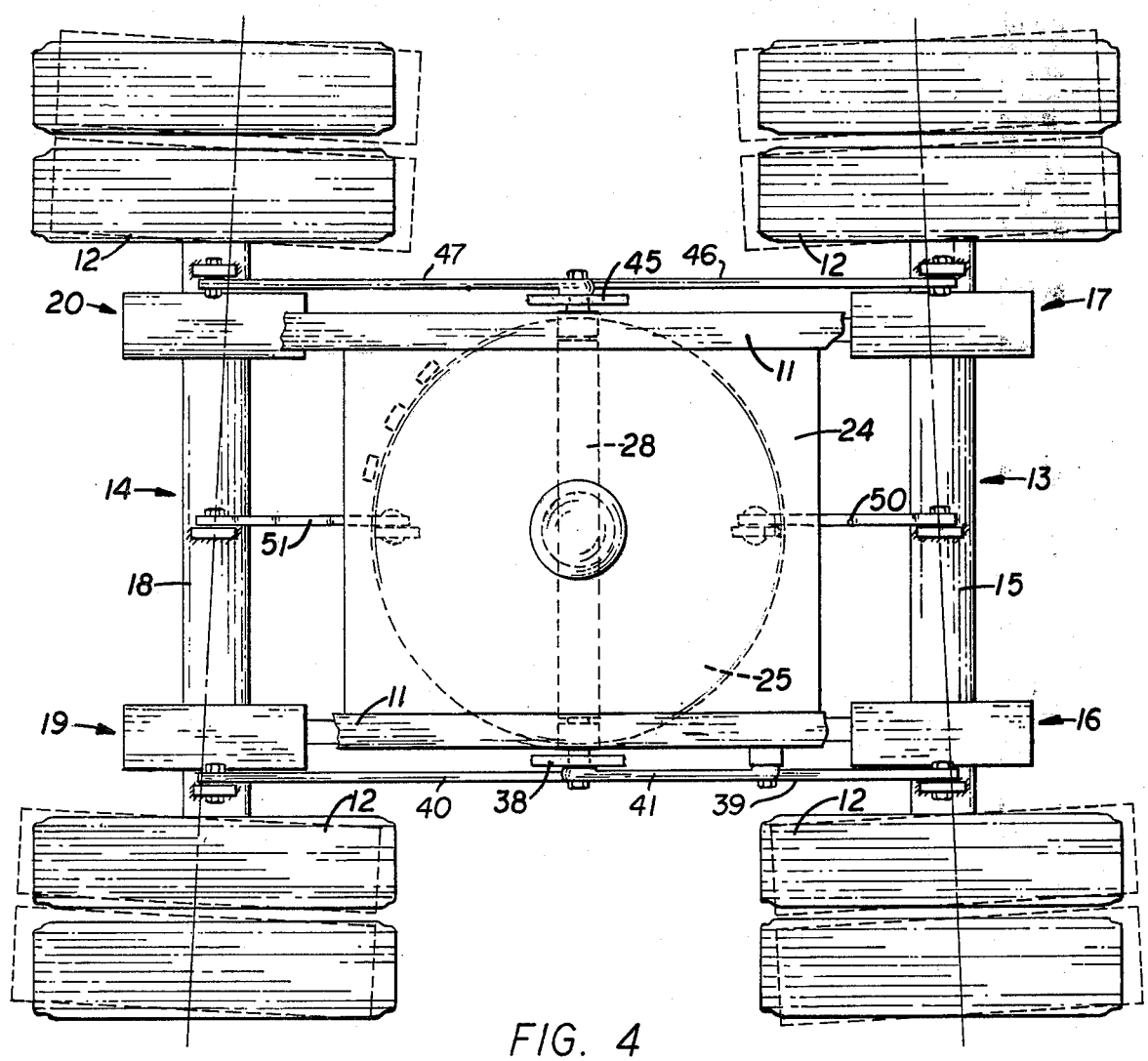
FIG. 4 is a top view of the bogie.

To make a left turn, the wheels 12 of the present bogie are turned from the straight position as shown in full lines in FIG. 4 to the positions shown in dashed lines by turning the entire front and rear axle assemblies 13 and 14 in opposite directions about respective vertical central axes. With reference to FIG. 1, during a left turn when a tractor is pulling the front end of the trailer to the left, the frame members 11 and the upper pivotal member 24 are rotated with respect to the lower pivotal member 25 and the lever rod 29 in the direction for the steering rod 41 to pull the upper end of the control lever 38 forward. This motion is transmitted through the lever 38, the front tie rod 39, and the rear tie rod 40 for moving the right end of the front axle assembly 13 forward and the right end of the rear axle assembly 14 rearward. With reference to FIG. 2, the motion from the steering rod 41 is applied through the lever rod 29 to rotate the lever 45 in the direction for pulling the front tie rod 46 and the left end of the front axle 13 rearward and pulling the rear tie rod 47 and the left end of the rear axle assembly 14 forward. The distances between the lever rod or fulcrum 29 and the points to which the steering rod 41 and the tie rods 39, 40, 46, and 47 are connected are determined by the distance between the tractor and the bogie and the distance between the front and rear axle assemblies 13 and 14 to cause the axles to be aligned with their respective radial lines of the turning circles. Obviously, for a right turn, the directions of motion of the lever 38, and the axle assemblies 13 and 14 are reversed.

For either direction of turning, the upper members 30 of the shackles 16, 17, 19, and 20 are moved mostly in either a forward or a rearward direction as required with respect to the lower members 31 of the shackles. Actually, the relative directions of travel between the upper members 30 and the lower members 31 are arcuate, and the normal distances between the respective members 30 and 31 are decreased equal small amounts. Therefore, with respect to the road wheels 12, the load on the frame members 11 is raised slightly while turning by force supplied through the steering rod 41 to the levers 38 and 45, and the horizontal components of force continually urge the axle assemblies 13 and 14 in the directions for straight travel of the trailer under control of the steering rod 41 to return and to maintain the road wheels 12 in the normal direction for straight travel.

I claim:

1. A steerable bogie comprising:

An upper main frame to carry a load, a front and a rear tandem axle assembly, each of said assemblies having an axle housing and road wheels, a right and a left shackle spaced apart on each of said axle housings, each of said shackles having an upper rigid member secured across a respective one of said axle housings and a lower rigid member spaced in a normal position below said upper rigid member, and flexible supporting means secured between said respective upper and lower rigid members to permit limited relative movement of said respective rigid members from said normal position in forward and rearward directions, pivotal means connected to the lower side of said main frame, said pivotal means having a lower pivotal plate and a central pivot in an upper central position of said bogie, said lower pivotal plate being rotatable horizontally about said central pivot over a limited range, a first suspension connected between said lower rigid members of each of said right shackles and having a respective upward extending means connected to said lower pivotal plate, a second suspension connected between said lower rigid members of each of left shackles and having a respective upward extending means connected also to said lower pivotal plate, said load being applied through said pivotal means, said suspensions, and said flexible supporting means successively to said axle housings and said road wheels, right connectors secured to each of said axle housings adjacent each of said right shackles, left connectors secured to each of said axle housings adjacent each of said left shackles, linkage-and-lever means having guiding linkage means connected to each of said right and left connectors, lever means pivotally connected to said lower pivotal plate, and steering linkage means connected between said lever means and said upper main frame to actuate said lever means in unison with rotation of said upper main frame with respect to said lower pivotal plate, said guiding linkage means being connected between said lever means and said connectors of said axle housings, said linkage-and-lever means during straight travel of said upper main frame positioning said respective upper and lower rigid members of said shackles in said normal positions for positioning said axle assemblies for straight tracking of said road wheels, and said linkage-and-lever means in response to turning of said upper main frame in either direction as desired with respect to said lower pivotal plate moving said upper rigid members of said shackles relative to said respective normal positions of said lower rigid members in the required directions for turning said axles in opposite directions as required about respective control vertical axes to facilitate turning said load in a desired direction.

2. A steerable bogie as claimed in claim 1 wherein said lever means includes a pivotal rod as a fulcrum rotatively coupled traversely across said lever pivotal plate and right and left levers secured to respective ends of said pivotal rod, said guiding linkage means being a tie rod for each of said connectors of said axle housing, said connectors adjacent said right shackles being connected by respective ones of said tie rods to said right lever, said connectors adjacent said left shackles being connected by respective ones of said tie rods to said left lever, said steering linkage means being a steering rod pivotally connected between said upper main frame at a point spaced longitudinally from said central pivot and one of said levers at a point substantially in vertical alignment with said fulcrum and spaced therefrom, and the ends of said tie rods being connected to said levers at points spaced from said fulcrum in respective vertical directions as required to facilitate turning of said load.

3. A bogie as claimed in claim 2 wherein each of said left and said right suspensions includes a leaf spring and each of said upward extending means includes a bracket, each of said brackets being attached to the center of said respective leaf spring and each of said upward extending means having an upper end pivotally connected to said pivotal rod for connection to said lower pivotal plate, each of said springs normally bowing downward from said center to respective ends thereof, and said ends of each leaf spring being pivotally connected to respective ones of said lower rigid members of said respective right and left shackles.

4. A bogie as claimed in claim 1 wherein each of said housings has an upward lever extending from the center thereof, and a bar connected between each of said levers and an adjacent point of said lower pivotal plate to prevent excessive rotation of said housing.

* * * * *